United States Patent [19]

Aspindle

[11] Patent Number: 5,173,581
[45] Date of Patent: Dec. 22, 1992

[54] ELECTRODE FOR TUNGSTEN INERT GAS WELDING

[75] Inventor: Edward S. Aspindle, Thornton, United Kingdom

[73] Assignee: British Nuclear Fuels plc, Cheshire, England

[21] Appl. No.: 798,533

[22] Filed: Nov. 26, 1991

[30] Foreign Application Priority Data

Dec. 15, 1990 [GB] United Kingdom ................. 9027235

[51] Int. Cl.⁵ ............................................. B23K 9/167
[52] U.S. Cl. ................................. 219/75; 219/145.21
[58] Field of Search .............................. 219/75, 145.21

[56] References Cited

U.S. PATENT DOCUMENTS

| | | |
|---|---|---|
| 3,019,330 | 1/1962 | Guida . |
| 4,471,208 | 9/1984 | Edmonds ....................... 219/145.21 |
| 5,026,968 | 6/1991 | Cuba ...................................... 219/75 |

FOREIGN PATENT DOCUMENTS

| | | |
|---|---|---|
| 0067062 | 12/1982 | European Pat. Off. . |
| 61-273295 | 12/1986 | Japan ...................................... 219/75 |
| 639674 | 12/1978 | U.S.S.R. . |

OTHER PUBLICATIONS

Derwent Abstract No. 79-74708B of SU 639,674.

Primary Examiner—Clifford C. Shaw
Attorney, Agent, or Firm—William R. Hinds

[57] ABSTRACT

A non-consumable electrode for tungsten inert gas welding. The electrode is formed from at least two portions in face-to-face relationship so as to define a longitudinal slit between them extending lengthwise of the electrode and terminating at the tip of the electrode. The slit acts as a cavity and ensures that spark initiation takes place from locations on the electrode where metal ion deposition is inhibited. The faces of the portions may be of flat form or of complementary contoured form.

9 Claims, 1 Drawing Sheet

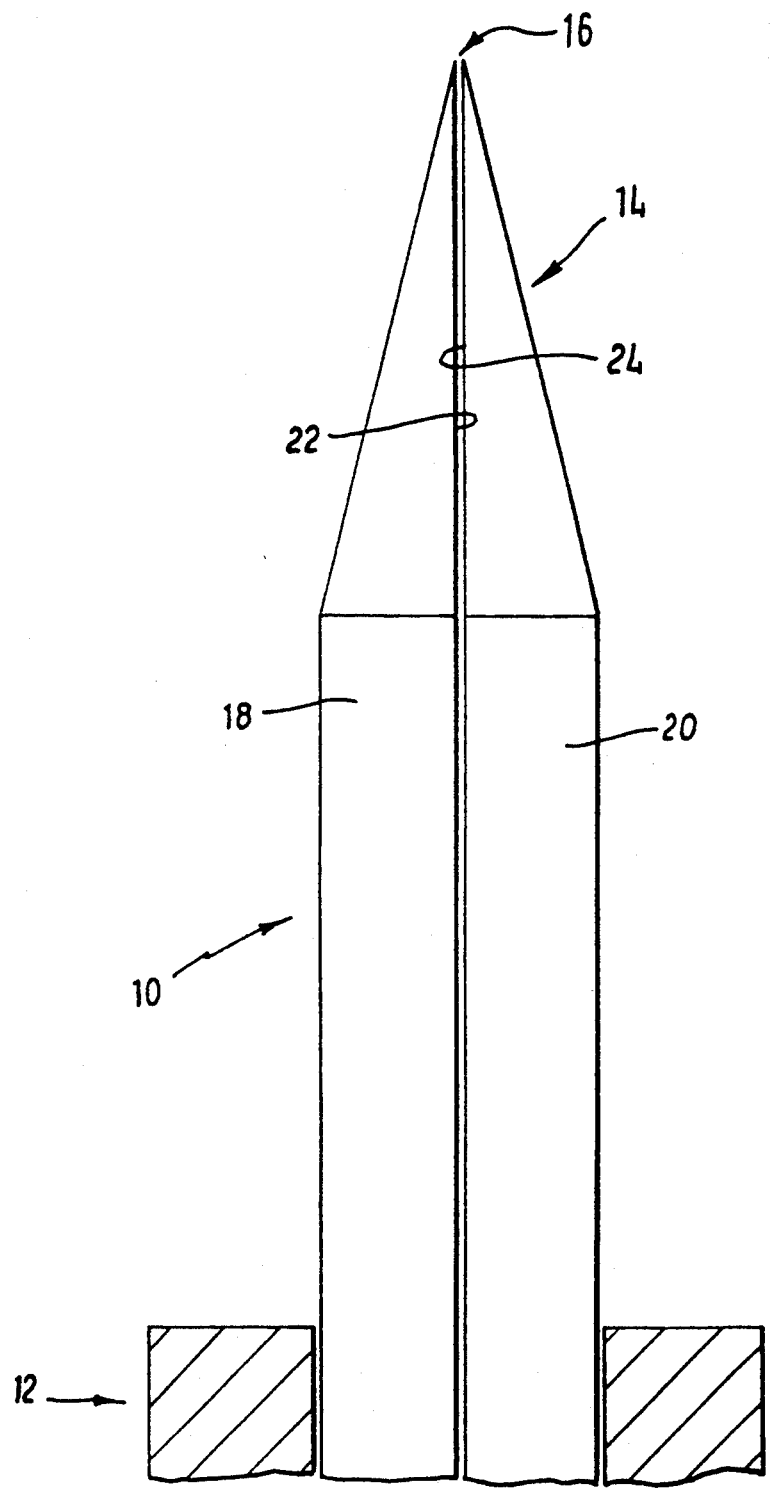

ELECTRODE FOR TUNGSTEN INERT GAS WELDING

This invention relates to non-consumable electrodes for tungsten inert gas welding.

In our prior European Patent No. 0067062 there is disclosed a non-consumable electrode for tungsten inert gas welding comprising an elongate body adapted to be carried in a holder and connected to a source of electrical power, the electrode body having a tapered tip which is closest to the joint to be welded and at least one cavity in said tapered tip so that, in use, spark initiation can take place from locations on the electrode from which metal ion deposition has been inhibited.

The object of the present invention is to provide an improved electrode construction which secures the advantages of the electrode construction disclosed in the prior European patent but is less prone to fracture and can be reground when the existing electrode tip becomes inefficient without a fresh slot having to be formed in the tip.

According to one aspect of the present invention, in a non-consumable electrode for tungsten inert gas welding comprising an elongate body adapted to be carried in a holder and connected to a source of electrical power, the electrode body having a tapered tip and at least one longitudinally extending cavity in the tapered tip so that, in use, spark initiation can take place from locations on the electrode from which metal ion deposition has been inhibited, the electrode body comprises at least two separatable parts extending longitudinally of the body and having faces of flat form so that when assembled and secured together in face-to-face relationship the parts define said at least one cavity between the faces.

Preferably, the cavity is in the form of a slit that extends from the tapered tip, and said slit may be of microscopic dimensions across the slit.

In one embodiment of the invention the electrode comprises a number of substantially identical axially extending parts which are clamped together by the holder part-way along their lengths so as to project freely beyond the holder. Preferably, there are two such electrode parts so that where the composite electrode cross-section is circular, the two parts are of semi-circular cross-section.

The electrode parts may be secured together in substantially face-to-face contact since, even in these circumstances where the slit(s) are of microscopic dimensions across the slit(s), metal ion deposition is inhibited at those locations where spark initiation takes place.

Because the slit(s) can extend for a considerable distance, the tapered tip of the composite electrode may be renewed by regrinding periodically to extend the useful life of the electrode and the slit(s) will still be present at the electrode tip. A further important advantage over the use of slots machined into the electrode tips as in prior European Patent No 0067062 is the avoidance of any discontinuities in the slit/slot. cross-section which would otherwise give rise to a risk of fracture due to stress concentration at such discontinuities.

According to a second aspect of the invention, in a method for making a non-consumable electrode for use in tungsten inert gas welding, the electrode is made in at least two separatable parts extending longitudinally of the electrode and having faces, the parts being assembled and secured together in face-to-face relationship to form a composite electrode defining at least one slit extending longitudinally between the faces. The composite electrode may be formed with a tapering tip by grinding the ends of said electrode parts after they have been assembled and secured together. Alternatively, the electrode parts may be each preformed with a tapering cross-section at one end thereof so that when assembled and secured together the one ends collectively form a tapering tip of the composite electrode.

One embodiment of the invention will now be described by way of example only with reference to the accompanying drawing.

BRIEF DESCRIPTION OF THE DRAWING

The sole drawing FIGURE is a fragmentary side view of a composite electrode in accordance with the invention.

As shown, the tungsten electrode for use in TIG welding comprises an elongate body 10 clamped in a collet-type holder 12. The body 10 may be circular or other cross-section and its tip 14 is ground to a point. The tip 14 is provided with a cavity in the form of a slit 16 for the reasons described in European Patent No 0067062, ie. to form a deposit-free space at which spark initiation can take place. The slit 16 is created by manufacturing the electrode in two parts 18, 20 having longitudinally extending flat faces 22 and 24. The two parts 18, 20 are clamped together with faces 22, 24 in contact by means of the holder 12. Although the parts 18, 20 are secured together in face to face contact there will nevertheless be a small cavity or gap between them represented by the slit 16 as shown in exaggerated form in the drawing when viewed on a microscopic scale. The tip 14 may be ground on the composite electrode, ie. with the separate electrode parts assembled together, or the electrode parts may be formed with tapering tip halves prior to assembly of the composite electrode.

It will be noted that the composite electrode may be reground periodically without requiring fresh machining of the slit. Also there are no stress-concentrating discontinuities present which could otherwise cause fracture and because the electrode parts can be secured together in intimate contact, the slit width can be made very small with the advantage that the arc position can be more well-defined than with a relatively wide slit.

As described above the faces 22, 24 define a slit in the composite electrode. However, other forms of cavity for forming deposit-free spaces at which spark initiation can occur may be produced by shaping the faces 22, 24 with appropriate contours. Also, instead of dividing the electrode body 10 into only two parts, the possibility exists of forming it in three or more parts to define a number of cavities.

I claim:

1. A non-consumable electrode for tungsten inert gas welding, comprising an elongate body adapted to be carried in a holder and for connection to a source of electrical power, the electrode body having a tapered tip, and at least one longitudinally extending cavity in the tapered tip so that, in use, spark initiation can take place from locations on the electrode from which metal ion deposition has been inhibited, wherein the improvement comprises the electrode body comprises at least two separatable parts extending longitudinally of the body, the parts having faces of flat form so that when assembled and secured together in face-to-face relationship the parts define said at least one cavity between the faces.

2. An electrode as claimed in claim 1, wherein the cavity is in the form of a slit that extends from the tapered tip.

3. An electrode as claimed in claim 2, wherein the slit is of microscopic dimensions across the slit.

4. An electrode as claimed in claim 2, wherein the parts are secured together with the faces thereof in contact thereby to define said slit.

5. An electrode as claimed in claim 4, wherein said parts are secured together by the holder part-way along their lengths so as to project freely beyond the holder.

6. A method of making a non-consumable electrode for use in tungsten inert gas welding, the improvement comprising the electrode being made in at least two separatable parts extending longitudinally of the electrode, the parts having faces, and securing the parts together in face-to-face relationship so as to form a composite electrode defining at least one slit extending longitudinally between the faces.

7. A method as claimed in claim 6, wherein the electrode is formed with a tapering tip by grinding the ends of said electrode parts after they have been assembled and secured together.

8. A method as claimed in claim 6, wherein the electrode parts are each preformed with a tapering cross-section at one end thereof so that when assembled and secured together the one ends collectively form a tapering tip of the electrode.

9. A method as claimed in claim 6, wherein the parts are assembled with the faces thereof in face-to-face contact.

* * * * *